US009689364B2

(12) United States Patent
Mack et al.

(10) Patent No.: US 9,689,364 B2
(45) Date of Patent: Jun. 27, 2017

(54) VENTED HIGH PRESSURE VALVE

(71) Applicant: Caterpillar Inc., Peoria, IL (US)

(72) Inventors: David Mack, Peoria, IL (US); Alan R. Stockner, Metamora, IL (US); John Unes, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 32 days.

(21) Appl. No.: 14/816,598

(22) Filed: Aug. 3, 2015

(65) Prior Publication Data
US 2017/0037824 A1 Feb. 9, 2017

(51) Int. Cl.
*F02M 63/02* (2006.01)
*F16K 15/02* (2006.01)
*F16K 24/04* (2006.01)
*F16K 27/02* (2006.01)

(52) U.S. Cl.
CPC ......... *F02M 63/023* (2013.01); *F16K 15/025* (2013.01); *F16K 24/04* (2013.01); *F16K 27/0209* (2013.01)

(58) Field of Classification Search
CPC ..... F02M 63/023; F16K 15/025; F16K 24/04; F16K 27/0209
USPC ............... 137/535, 540, 514.3, 514.5, 514.7
See application file for complete search history.

(56) References Cited

U.S. PATENT DOCUMENTS

| | | | | |
|---|---|---|---|---|
| 955,043 A | * | 4/1910 | Barr et al. ........... | F16K 17/0433 137/514.7 |
| 956,789 A | * | 5/1910 | Allan ..................... | F16K 15/03 137/514 |
| 965,052 A | * | 7/1910 | Wainwright ........ | F16K 17/0433 123/189 |
| 1,138,338 A | * | 5/1915 | Whitney ............... | F16K 15/063 137/514.5 |
| 1,258,167 A | * | 3/1918 | Vollmann ............ | F16K 17/0433 137/512 |
| 1,754,975 A | * | 4/1930 | Andersen ............... | F16K 15/06 137/514.5 |
| 3,550,617 A | * | 12/1970 | Johnson ............... | F16K 17/00 137/514.5 |
| 3,818,929 A | | 6/1974 | Braukmann | |
| 4,385,747 A | | 5/1983 | Renaud, Jr. et al. | |

(Continued)

FOREIGN PATENT DOCUMENTS

CN 203146838 U 8/2013

*Primary Examiner* — Craig Schneider
*Assistant Examiner* — Kevin Barss
(74) *Attorney, Agent, or Firm* — Baker Hostetler

(57) ABSTRACT

A valve assembly for a fuel pump is disclosed. In certain aspect, the valve assembly includes a housing defining a valve chamber, a valve inlet in fluid communication with the valve chamber, a valve outlet in fluid communication with the valve chamber, a valve seat; a valve body movably disposed within the valve chamber, a retainer sealingly engaging the housing and defining a cavity between the base portion of the valve body and the retainer, wherein the retainer comprises one or more control orifices formed therein and configured to provide fluid communication to the cavity to regulate a position of the valve body based on at least a pressure difference between the valve chamber and the cavity, and a spring member disposed between the retainer and the valve body, wherein the spring member is configured to bias the valve body.

6 Claims, 9 Drawing Sheets

(56) References Cited

U.S. PATENT DOCUMENTS

| | | | | |
|---|---|---|---|---|
| 4,603,710 | A * | 8/1986 | Tiefenthaler | F16K 15/02 137/514.7 |
| 5,762,320 | A | 6/1998 | Williams et al. | |
| 6,132,191 | A * | 10/2000 | Hugenroth | F04C 29/126 137/220 |
| 8,136,547 | B2 * | 3/2012 | Francini | F16K 15/026 137/514.3 |
| 8,944,033 | B2 * | 2/2015 | Coldren | F02D 19/061 123/525 |
| 8,991,363 | B2 * | 3/2015 | Steffen | F02D 41/0025 123/525 |
| 9,027,534 | B2 * | 5/2015 | Kim | F02D 19/0605 123/299 |
| 2013/0312706 | A1 * | 11/2013 | Salvador | F02M 63/0245 123/457 |

* cited by examiner

VENTED HIGH PRESSURE VALVE

TECHNICAL FIELD

This patent disclosure relates generally to high pressure valves and, more particularly, to a system and method for venting high pressure valves.

BACKGROUND

High-pressure fuel pump systems are used in a variety of motorized platforms, including those of trucks, buses, and automobiles, as well as off-road machines utilized in construction, mining, and agricultural fields. They are also utilized in marine as well as industrial applications, the latter including, by way of example, electric power generation and petroleum drilling rigs. Such pumps are generally mechanically driven via associated engines for delivering fuel under high pressure to fuel injectors and into individual cylinders of the engines through so-called common rail fuel systems.

Common rail fuel systems generally include fuel delivery components associated with a high-pressure variable delivery pumps. A variable delivery pump may be effective to deliver high-pressure fuel into a manifold that acts as a central accumulator for the high-pressure fuel prior to its delivery to individual injectors. The manifold thus dampens pressure fluctuations occurring from discreet high pressure pumping events. Typically, the fuel is sourced from a fuel tank by means of a low pressure fuel transfer pump to the variable delivery high-pressure fuel pump.

Apart from atmospheric emissions control purposes, the fuel is pressurized to facilitate the accurately timed and controlled delivery of discrete fuel amounts to the fuel injectors. As such, an electronic control system is generally employed to monitor and optimize system fuel pressure. The electronic control system operates the high-pressure pump as well as each of the electronically actuated fuel injectors to optimize fuel pressure and quantity, as well as timing of delivery, under a variety of engine operating conditions.

Normally, such systems include capabilities for managing fluid dynamics and pressurization of the fuel pump manifold and or rails. As an example, high pressure valves can be used to manage fluid flow and pressure control. However, life of the valve seat is such high pressure valves is often limited due to relative motion and the high contact stress between the valve body and valve seat. The combination of high stress and motion results in adhesive wear which ultimately results in valve leakage. Improvements in valve operation are needed to maintain operable life of the components and minimize leakage.

As an example, U.S. Pat. No. 5,012,785 (the '785 patent) describes a valve operatively mounted in an axially extending center bore of a high pressure pump rotor. The valve axially shifts between an open position in which a charge of fuel generated by the pump is transmitted as a pressure wave to a fuel injector nozzle and a closed position in which the pump charging chamber is sealed from the injection line and the injection line is vented to low pressure so that secondary pressure waves reflecting from the injector nozzle will be routed to the low pressure line for dissipation therein rather than rebounding from the delivery valve. Although the injection line of the '785 patent is vented, such venting does not address valve motion control and minimizing wear between the valve body and the valve seat. These and other shortcomings of the prior art are address by this disclosure.

SUMMARY

In one aspect, the disclosure describes a housing defining a valve chamber, wherein the valve chamber comprises a first end and a second end opposite the first end; a valve inlet disposed adjacent the first end of the valve chamber and in fluid communication therewith, wherein the valve chamber is configured to receive a flow of fluid from the valve inlet; a valve outlet in fluid communication with the valve chamber to receive a flow of fluid from the valve chamber; a valve seat fixedly disposed at the first end of the valve chamber; a valve body movably disposed within the valve chamber, the valve body comprising a valve head and a base portion; a retainer sealingly engaging the housing and defining a cavity between the base portion of the valve body and the retainer, wherein the retainer comprises one or more control orifices formed therein and configured to provide fluid communication to the cavity to regulate a position of the valve body between the first end and the second end of the valve chamber based on at least a pressure difference between the valve chamber and the cavity; and a spring member disposed between the retainer and the valve body, wherein the spring member is configured to bias the valve body towards the first end of the valve chamber, and wherein the valve head of the valve body is configured to abut against the valve seat to prevent a flow of fluid between the valve inlet and the valve chamber.

In another aspect, the disclosure describes a housing defining a valve chamber, wherein the valve chamber comprises a first end and a second end opposite the first end; a valve inlet disposed adjacent the first end of the valve chamber and in fluid communication therewith, wherein the valve inlet is in fluid communication with a fuel pump and the valve chamber is configured to receive a flow of fluid from the valve inlet; a valve outlet adjacent the second end of the valve chamber and in fluid communication therewith, wherein the valve outlet is in fluid communication with a fuel manifold and is configured to receive a flow of fluid from the valve chamber and direct the flow of fluid to the manifold; a valve seat fixedly disposed at the first end of the valve chamber; a valve body movably disposed within the valve chamber, the valve body comprising a valve head and a base portion; a retainer sealingly engaging the housing and defining a cavity between the base portion of the valve body and the retainer, wherein the retainer comprises one or more control orifices formed therein and configured to provide fluid communication to the cavity to regulate a position of the valve body between the first end and the second end of the valve chamber based on at least a pressure difference between the valve chamber and the cavity; and a spring member disposed between the retainer and the valve body, wherein the spring member is configured to bias the valve body towards the first end of the valve chamber, and wherein the valve head of the valve body is configured to abut against the valve seat to prevent a flow of fluid between the valve inlet and the valve chamber.

In yet another aspect, the disclosure describes a housing defining a valve chamber, wherein the valve chamber comprises a first end and a second end opposite the first end; a valve inlet disposed adjacent the first end of the valve chamber and in fluid communication therewith, wherein the valve chamber is configured to receive a flow of fluid from the valve inlet; a valve outlet in fluid communication with the valve chamber to receive a flow of fluid from the valve chamber; a valve seat fixedly disposed at the first end of the valve chamber; a valve body movably disposed within the valve chamber, the valve body comprising a valve head and a base portion, wherein the base portion defines a fluid chamber having a channel formed in an outer surface of the base portion; a retainer sealingly engaging the housing and defining a cavity between the base portion of the valve body and the retainer, wherein the retainer comprises a plurality of control orifices formed therein and configured to provide fluid communication to the cavity to regulate a position of the valve body between the first end and the second end of the valve chamber based on at least a pressure difference between the valve chamber and the cavity, and wherein a position of the valve body between the first end and the second end of the valve chamber controls an alignment of the channel formed in the valve body and one or more of the plurality of control orifices; and a spring member disposed between the retainer and the valve body, wherein the spring member is configured to bias the valve body towards the first end of the valve chamber, and wherein the valve head of the valve body is configured to abut against the valve seat to prevent a flow of fluid between the valve inlet and the valve chamber.

DETAILED DESCRIPTION

Figure 1:
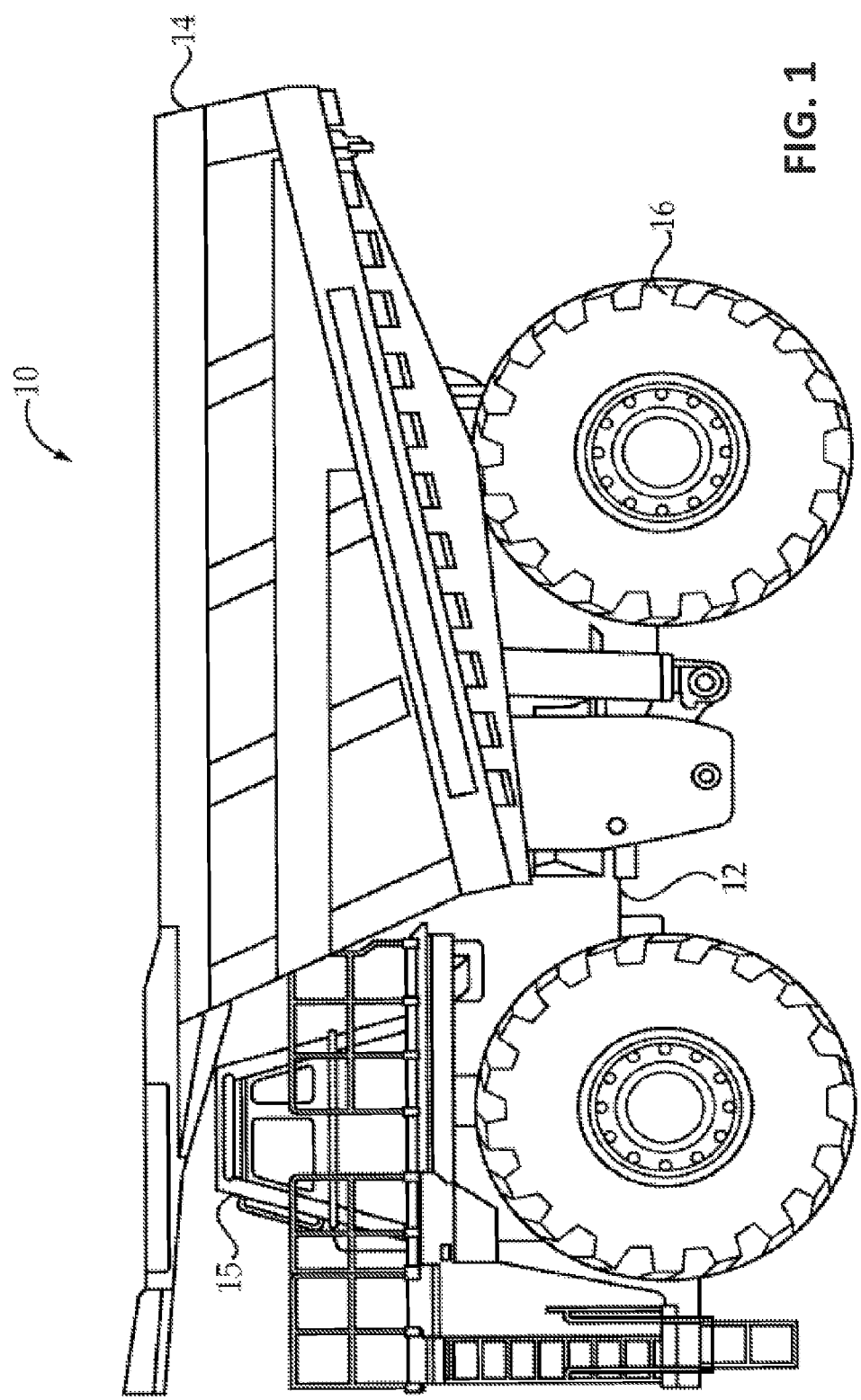
FIG. 1 is a perspective view of a machine constructed in accordance with the aspects of the disclosure.

Referring now to the drawings, and with specific reference to FIG. 1, a machine 10 includes a machine body 12 supported on a conveyance 16. In the illustrated embodiment, the machine 10 is shown as a mining truck, and the conveyance 16 is shown as wheels. However, the machine 10 could take a wide variety of forms, and the conveyance 16 could also vary substantially. For instance, the conveyance 16 could be tracks or possibly even a propeller in the case of a machine in the form of a seagoing vessel. The machine 10 includes a dump body 14 pivotally attached to the machine body 12, and also an operator station 15. One could expect a duty cycle for the machine 10 to include time periods of idling without movement such as when the machine 10 is waiting to receive a load, such as ore, in the dump body 14, waiting to dump a load, and maybe even waiting to be refueled. Between these motionless idling periods, one might expect the machine 10 to be operating at full power carrying a heaving load in the dump body 14 may be up a steep grade at a mining site. During motionless idling, the engine powering the machine 10 might consume only miniscule amounts of fuel. When operating at full power carrying a heavy load up a steep grade, one might expect the machine 10 to consume relatively large quantities of fuel.

Figure 2:
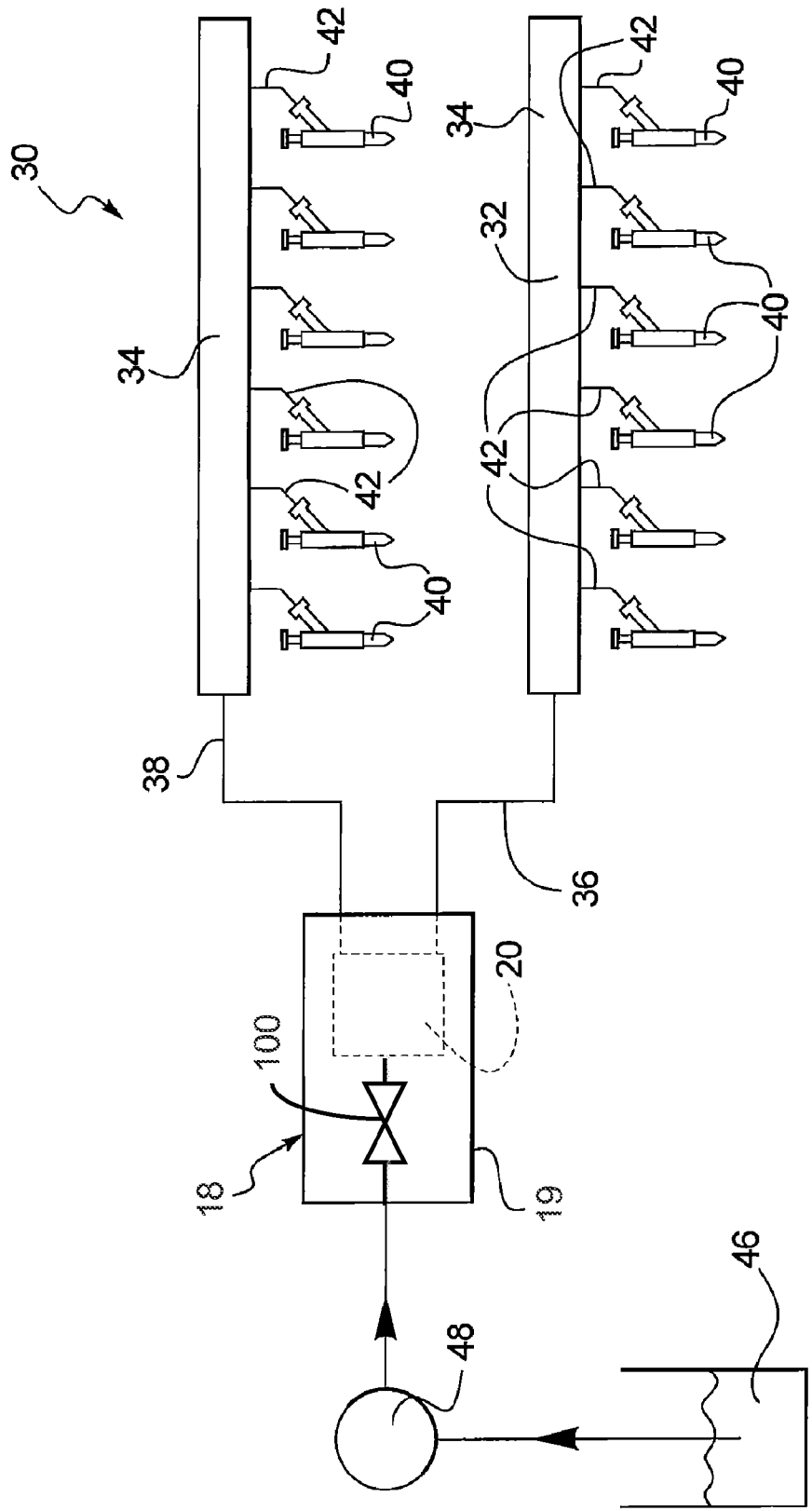
FIG. 2 is a schematic view of a fuel pump manifold and associated fuel rails that may be utilized within a fuel system in accordance with aspects of the disclosure.

In certain aspects, the machine 10 may be powered by an engine that includes an intake manifold fluidly connected to a plurality engine cylinders. Referring now to FIG. 2, a high-pressure fuel delivery system 30 for such an engine is shown schematically. From the pump manifold 20, fuel may be directed into respective left and right fuel rails 32 and 34, by way of respective left and right fuel pump lines or conduits 36 and 38. The fuel travels into injectors 40 (only one of which is shown) by means of a plurality of injection lines 42. The injection lines 42 extend from both the left and right rails 32, 34, into each of the injectors 40. In the described embodiment, it may be appreciated that each of the rails 32, 34 supplies fuel to a bank of eight cylinders, thus to a total of 16 cylinders of a V-16 cylinder engine in the disclosed embodiment, and by way of example only. Each of the fuel injectors 40 is adapted to inject pressurized fuel into an associated combustion chamber (not shown) under predetermined conditions of timing, fuel pressure, and fuel flow rate, in accordance with real-time engine conditions, as will be appreciated by those skilled in the art.

In the described embodiment, the plurality of fuel rails may in some arrangements be replaced by individual canisters or chambers for handling accumulated volumes of fuel prior to actual entry of the fuel into individual injectors. Such chambers or canisters may act as a plurality of fuel injection accumulators, each adapted for supplying pressurized fuel to at least one fuel injector. In such cases, such canisters, chambers, and/or accumulators would be considered equivalent to fuel rails by those skilled in the art, and are so treated herein.

With respect to the specific embodiment of the fuel rails 32, 34 shown and described herein, mounting clamps not shown) may be effective to secure the rails within the pump housing 19 of the disclosed embodiment. Alternatively, the structures of the pump manifold 20 and the fuel rails 32, 34, and even the fuel pump conduits 36 and 38 may be formed as an interior part of the housing 19, or as separate manifold blocks, or even as individual components bolted to the housing 19. FIG. 2 also schematically depicts fuel flow from the fuel tank 46 through the low pressure fuel transfer pump 48, and into the high-pressure pump 18. As will be discussed in further detail, the high-pressure pump 18 may include or may be in fluid communication with a valve assembly 100 to manage a flow of fluid such as fuel to the manifold.

Figure 3:
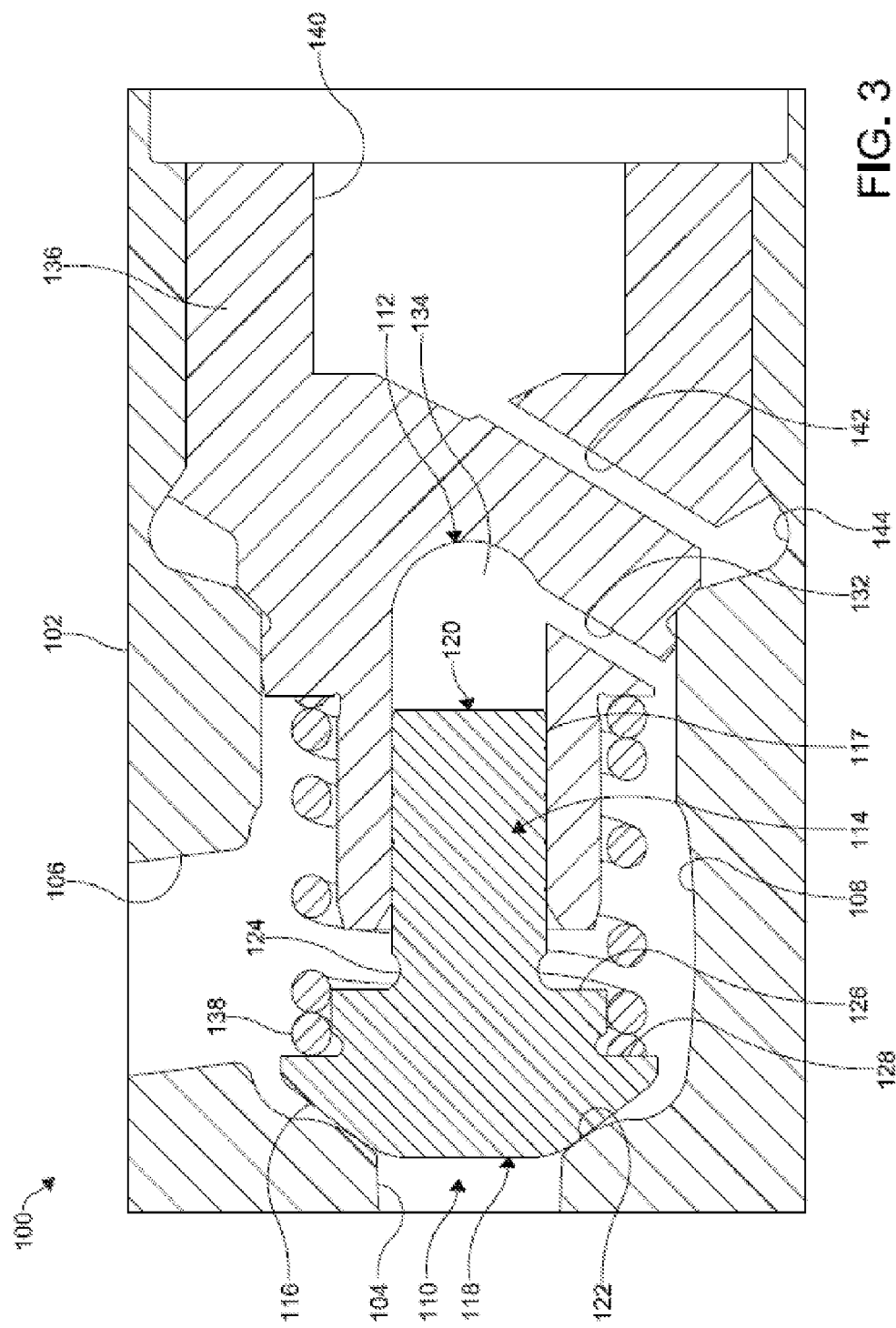
FIG. 3 is a cross-sectional view of a portion of a fuel pump including a valve assembly in accordance with aspects of the present disclosure, where the valve assembly is shown in a closed position.

FIG. 3 illustrates a cross-sectional view of the valve assembly 100 according to aspects of the present disclosure, where the valve assembly 100 is shown in a closed position. The valve assembly 100 may include a housing 102 having a valve inlet 104 and a valve outlet 106 formed therein. As shown, the valve assembly 100 may include a valve chamber 108 defined by a portion of the housing 102. The valve chamber 108 may have a first end 110 and a second end 112 opposite the first end 110. The valve chamber 108 may be in fluid communication with the valve inlet 104 and the valve outlet 106. As shown in FIG. 3, the valve inlet 104 may be disposed adjacent the first end 110 of the valve chamber 108 and the valve outlet 106 may be disposed along a length of the valve chamber 108 between the first end 110 and the second end 112 of the valve chamber 108.

Figure 4:
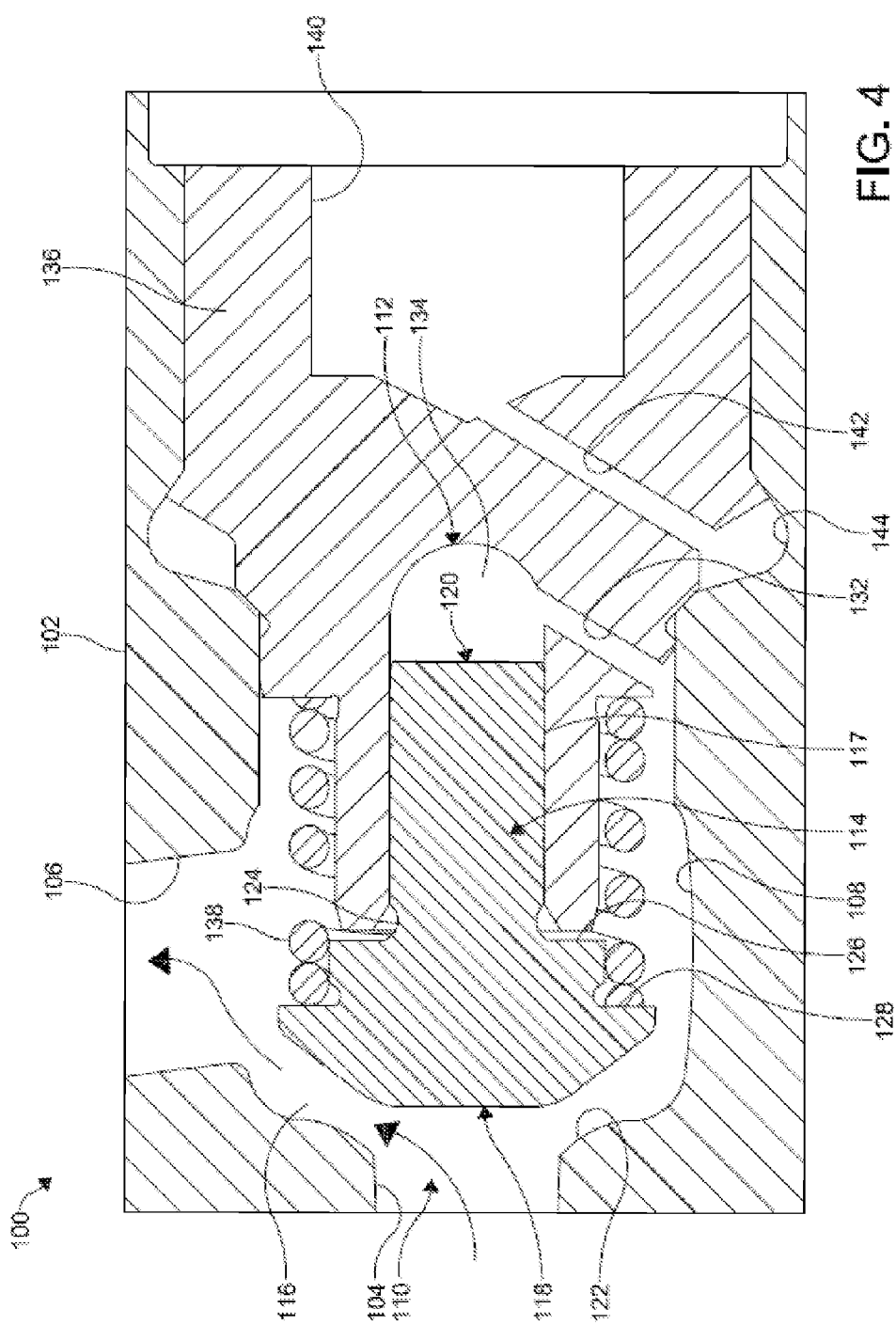
FIG. 4 is a cross-sectional view of the valve assembly of FIG. 3, showing the valve assembly in an opened position.

The valve body 114 may be moveably disposed in the valve chamber 108. The valve body 114 may include a valve head 116 formed at a first end 118 of the valve body 114 opposite a second end 120 thereof. As shown, the valve head 116 may be oriented toward the first end 110 of the valve chamber 108. The valve head 116 may be configured to abut a valve seat 122 formed in a portion of the housing 102, for example, adjacent the valve inlet 104 at the first end 110 of the valve chamber 108. As shown in FIG. 3, the valve head 116 is in sealing engagement with the valve seat 122 such that the valve assembly 100 is in a closed or seated position. As shown in FIG. 4, the valve head 116 is spaced (e.g., lifted) from the valve seat 122 such that the valve assembly 100 is in an opened position.

Returning to FIG. 3, the valve body 114 may include a base portion 117 extending from the valve head 116. As shown, the base portion 117 may terminate at a first shoulder 126 that extends beyond an outside diameter of the base portion 117. As an example, a second shoulder 128 may be formed at a portion of the valve head 116 and may extend beyond an outside diameter of the first shoulder 126.

A retainer 136 may be disposed adjacent the second end 112 of the valve chamber 108 and may sealingly engage a portion of the housing 102. A portion of the retainer 136 may define at least a portion of the cavity 134. As an example, the cavity 134 may be defined by the retainer 136, a portion of the housing 102, and the second end 120 of the valve body 114.

The retainer 136 may include one or more control orifices 132 extending therethrough. As an example, the control orifices 132 may provide fluid communication between the cavity 134 and a portion of the valve chamber 108. The control orifices 132 may be of varying size and shape. Further, the control orifices 132 may include one or multiple flow restriction means configured to controllably manipulate flow dynamics of the system. The control orifices 132 may include holes, channels (e.g., flutes), and other arrangement to control flow dynamics through the retainer 136.

The retainer 136 may define at least a portion of a fluid chamber 140 such as a low pressure side of the valve assembly 100. A fluid passage 142 may provide fluid communication between the fluid chamber and a cavity 144 formed between the retainer 136 and the housing 102.

A spring member 138 may be disposed in the cavity 134 and may be configured to bias the valve body 114 toward the valve seat 122. As shown, the spring member 138 is disposed between the retainer 136 and the valve body 114 (e.g., the second shoulder 128). As an example, the spring member 138 may be or include a coil spring. Other biasing elements may be used.

As shown in FIG. 3, the valve head 116 is in sealing engagement with the valve seat 122 such that the valve assembly 100 is in a closed or seated position, thereby preventing a flow of the liquid fuel between the valve inlet 104 and the valve chamber 108. As pressurized fluid flows through the valve inlet 104, such as during actuation of a plunger or piston of an associated high-pressure pump (e.g., pump 18 (FIG. 2)), a force is exerted on the valve head 116 in opposition to the bias of the spring member 138. As pressure builds at the valve inlet 104, the forces on the valve head 116 exceed the bias force of the spring member 138 and the valve body 114 moves away from the valve seat 122 and compresses the spring member 138. As an example, the pressure at the valve inlet 104 may be about 1800-2500 bar during a high pressure operation. Additionally, as the valve body 114 moves away from the valve seat 122, the fluid in the cavity 134 is compressed, thereby providing an additional biasing force in opposition of the movement of the valve body 114 toward the cavity 134. The fluid pressure in the cavity 134 mitigates pressure impulses that would normally cause the valve body 114 to compress the spring member 138 and even contact the retainer 136 at high velocities. The dimensions of the control orifices 132, a cross-sectional area of the valve body 114, and the stiffness of the spring member 138 may be configured so as to control a movement and/or position of the valve body 114 under various pressure conditions.

As shown in FIG. 4, the valve head 116 is spaced (e.g., lifted) from the valve seat 122 such that the valve assembly 100 is in an opened position. As such, fluid may flow from the valve inlet 104 to the valve outlet 106 and on to a manifold such as a manifold 20 (FIG. 2), for example. When pressure is reduced at the valve inlet 104, the spring member 138 biases the valve body 114 toward the valve seat 122. However, the bias force of the spring member 138 is controlled by a pressure change in the cavity 134. For example, as the valve body 114 moves toward the valve seat 122, a pressure is reduced in the cavity 134 causing an opposing force to the bias of the spring member 138. The control orifices 132 allow fluid to back fill the cavity 134 in a controlled manner and such control orifices 132 may be configured along with the spring member 138 to provide a controlled motion of the valve body 114.

As an illustrative example, as the linear motion of the valve body 114 changes the volume of the cavity 134, a sudden motion of the valve body 114 is impeded by the flow dynamics of the cavity 134. Therefore, the cavity 134 decreases the maximum impact velocity of both the strokes and return motions of the valve body 114. As such, wear of the valve assembly 100 may be reduced and the life expectancy of the spring member 138 may be increased.

Figure 5:
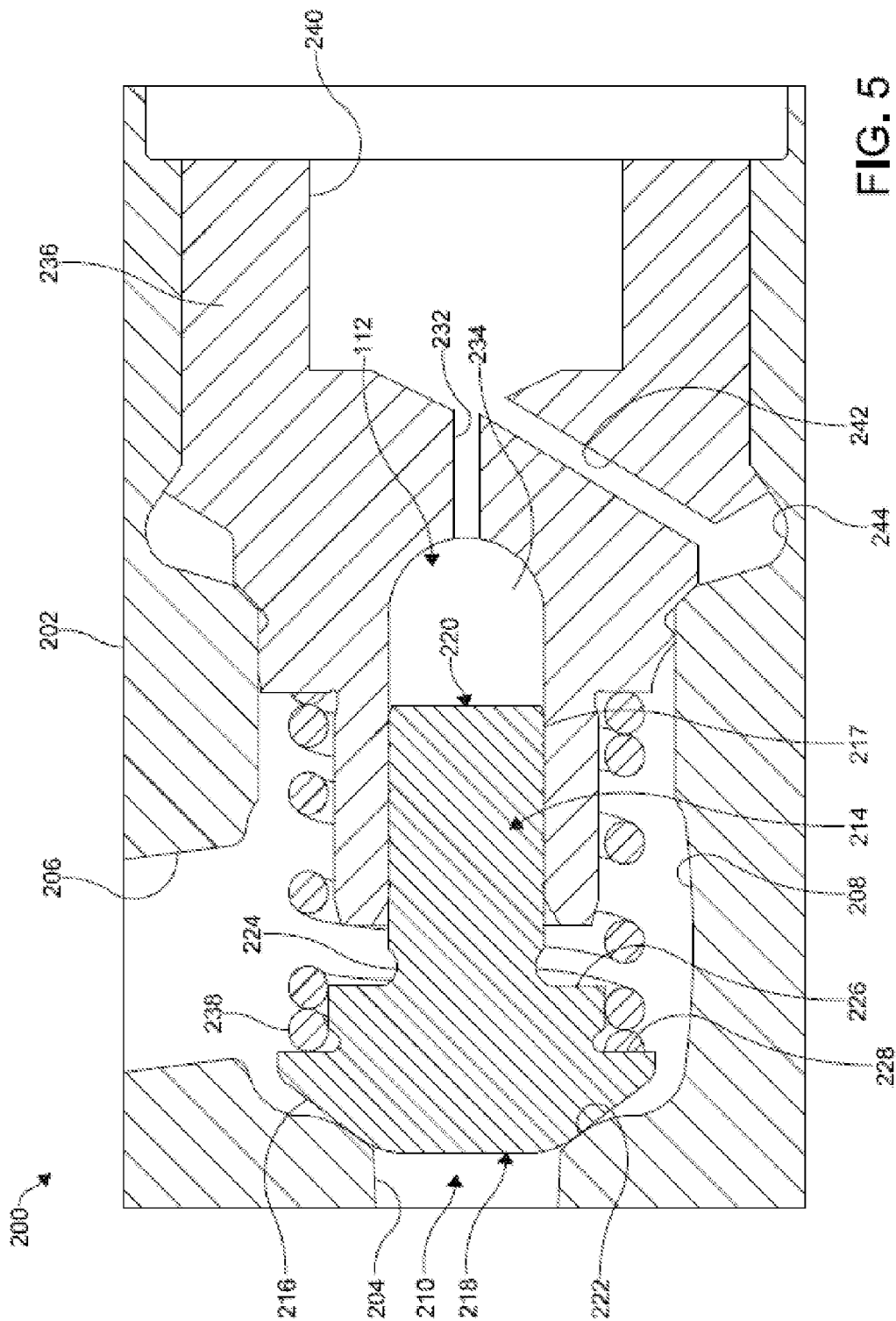
FIG. 5 is a cross-sectional view of a portion of a fuel pump including a valve assembly in accordance with aspects of the present disclosure, where the valve assembly is shown in a closed position.

FIG. 5 illustrates a cross-sectional view of the valve assembly 200 according to aspects of the present disclosure, where the valve assembly 200 is shown in a closed position. The valve assembly 200 may include a housing 202 having a valve inlet 204 and a valve outlet 206 formed therein. As shown, the valve assembly 200 may include a valve chamber 208 defined by a portion of the housing 202. The valve chamber 208 may have a first end 210 and a second end 212 opposite the first end 210. The valve chamber 208 may be in fluid communication with the valve inlet 204 and the valve outlet 206. As shown in FIG. 5, the valve inlet 204 may be disposed adjacent the first end 210 of the valve chamber 208 and the valve outlet 206 may be disposed along a length of the valve chamber 208 between the first end 210 and the second end 212 of the valve chamber 208.

Figure 6:
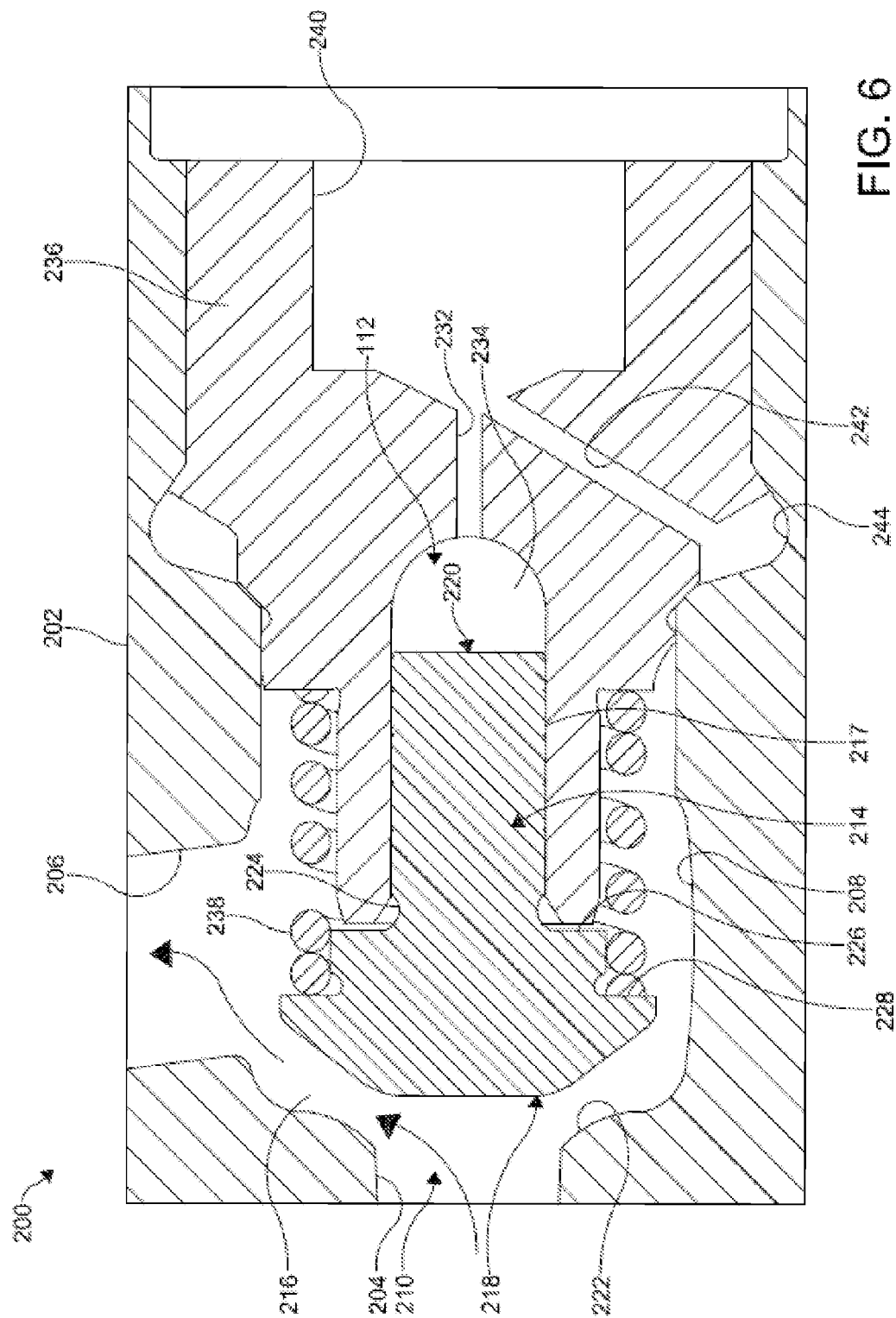
FIG. 6 is a cross-sectional view of the valve assembly of FIG. 5, showing the valve assembly in an opened position.

The valve body 214 may be moveably disposed in the valve chamber 208. The valve body 214 may include a valve head 216 formed at a first end 218 of the valve body 214 opposite a second end 220 thereof. As shown, the valve head 216 may be oriented toward the first end 210 of the valve chamber 208. The valve head 216 may be configured to abut a valve seat 222 formed in a portion of the housing 202, for example, adjacent the valve inlet 204 at the first end 210 of the valve chamber 208. As shown in FIG. 5, the valve head 216 is in sealing engagement with the valve seat 222 such that the valve assembly 200 is in a closed or seated position. As shown in FIG. 6, the valve head 216 is spaced (e.g., lifted) from the valve seat 222 such that the valve assembly 200 is in an opened position.

Returning to FIG. 5, the valve body 214 may include a base portion 217 extending from the valve head 216. As shown, the base portion 217 may terminate at a first shoulder 226 that extends beyond an outside diameter of the base portion 217. As an example, a second shoulder 228 may be formed at a portion of the valve head 216 and may extend beyond an outside diameter of the first shoulder 226.

A retainer 236 may be disposed adjacent the second end 212 of the valve chamber 208 and may sealingly engage a portion of the housing 202. A portion of the retainer 236 may define at least a portion of the cavity 234. As an example, the cavity 234 may be defined by the retainer 236, a portion of the housing 202, and the second end 220 of the valve body 214.

The retainer 236 may include one or more control orifices 232 extending therethrough. As an example, the control orifices 232 may provide fluid communication between the cavity 234 and a fluid chamber 240 such as a low pressure side of the valve assembly 200. As a further example, the fluid chamber 240 may experience pressures on the order of about 4-5 bar. The control orifices 232 may be of varying size and shape. Further, the control orifices 232 may include one or multiple flow restriction means configured to controllably manipulate flow dynamics of the system. The control orifices 232 may include holes, channels (e.g., flutes), and other arrangement to control flow dynamics through the retainer 236.

The retainer 236 may define at least a portion of the fluid chamber 240 such as a low pressure side of the valve assembly 200. As a further example, the fluid chamber 240 may experience pressures on the order of about 4-5 bar. A fluid passage 242 may provide fluid communication between the fluid chamber and a cavity 244 formed between the retainer 236 and the housing 202.

A spring member 238 may be disposed in the cavity 234 and may be configured to bias the valve body 214 toward the valve seat 222. As shown, the spring member 238 is disposed between the retainer 236 and the valve body 214 (e.g., the second shoulder 228). As an example, the spring member 238 may be or include a coil spring. Other biasing elements may be used.

As shown in FIG. 5, the valve head 216 is in sealing engagement with the valve seat 222 such that the valve assembly 200 is in a closed or seated position, thereby preventing a flow of the liquid fuel between the valve inlet 204 and the valve chamber 208. As pressurized fluid flows through the valve inlet 204, such as during actuation of a plunger or piston of an associated high-pressure pump (e.g., pump 18 (FIG. 2)), a force is exerted on the valve head 216 in opposition to the bias of the spring member 238. As pressure builds at the valve inlet 204, the forces on the valve head 216 exceed the bias force of the spring member 238 and the valve body 214 moves away from the valve seat 222 and compresses the spring member 238. As an example, the pressure at the valve inlet 204 may be about 1800-2500 bar during a high pressure operation. Additionally, as the valve body 214 moves away from the valve seat 222, the fluid in the cavity 234 is compressed, thereby providing an additional biasing force in opposition of the movement of the valve body 214 toward the cavity 234. The fluid pressure in the cavity 234 mitigates pressure impulses that would normally cause the valve body 214 to compress the spring member 238 and even contact the retainer 236 at high velocities. The dimensions of the control orifices 232, a cross-sectional area of the valve body 214, and the stiffness of the spring member 238 may be configured so as to control a movement and/or position of the valve body 214 under various pressure conditions.

As shown in FIG. 6, the valve head 216 is spaced (e.g., lifted) from the valve seat 222 such that the valve assembly 200 is in an opened position. As such, fluid may flow from the valve inlet 204 to the valve outlet 206 and on to a manifold such as manifold 20 (FIG. 2), for example. When pressure is reduced at the valve inlet 204, the spring member 238 biases the valve body 214 toward the valve seat 222. However, the bias force of the spring member 238 is controlled by a pressure change in the cavity 234. For example, as the valve body 214 moves toward the valve seat 222, a pressure is reduced in the cavity 234 causing an opposing force to the bias of the spring member 238. The control orifices 232 allow fluid to back fill the cavity 234 in a controlled manner and such control orifices 232 may be configured along with the spring member 238 to provide a controlled motion of the valve body 214.

As an illustrative example, as the linear motion of the valve body 214 changes the volume of the cavity 234, a sudden motion of the valve body 214 is impeded by the flow dynamics of the cavity 234. Therefore, the cavity 234 decreases the maximum impact velocity of both the strokes and return motions of the valve body 214. As such, wear of the valve assembly 200 may be reduced and the life expectancy of the spring member 238 may be increased.

Figure 7:
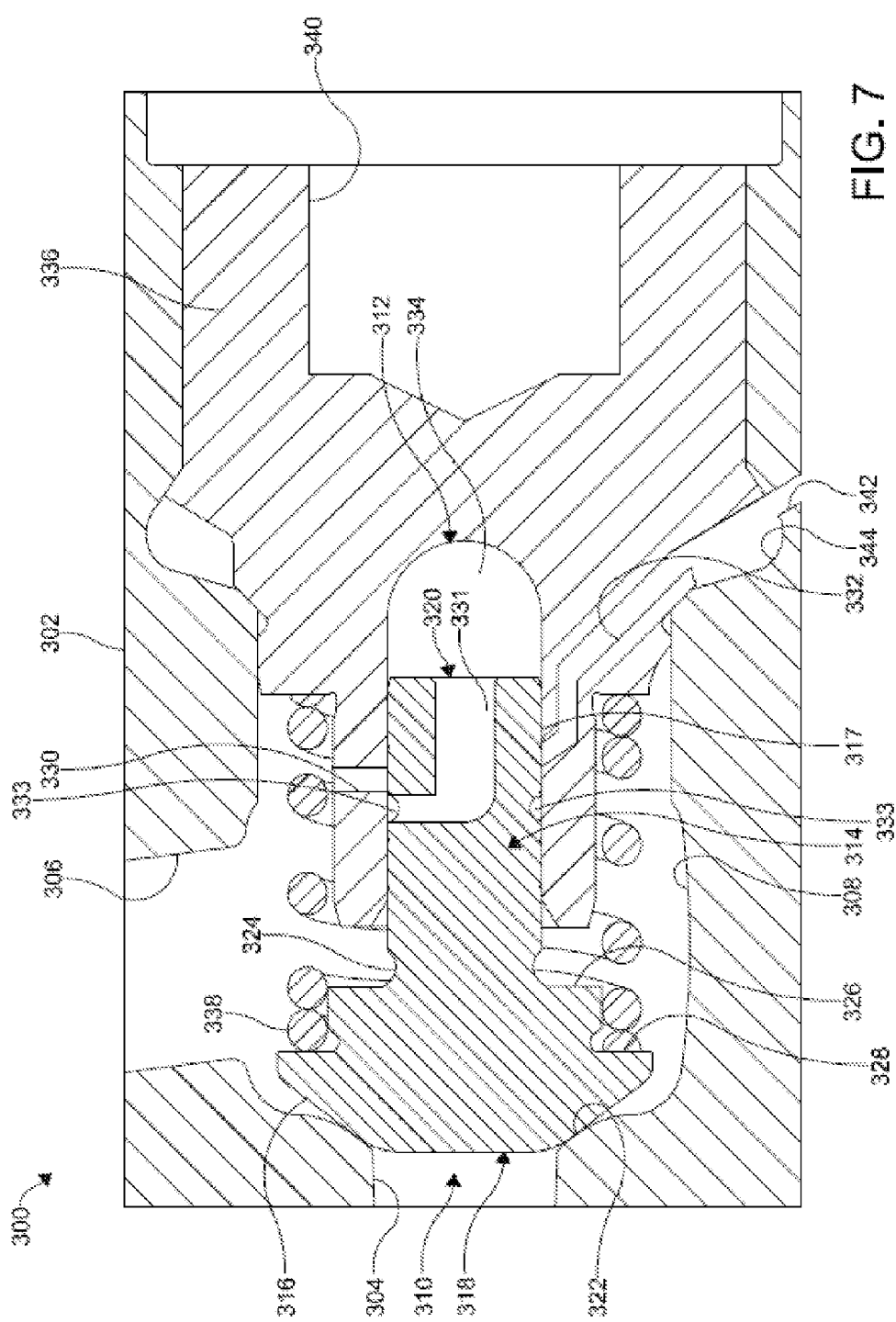
FIG. 7 is a cross-sectional view of a portion of a fuel pump including a valve assembly in accordance with aspects of the present disclosure, where the valve assembly is shown in a closed position.

FIG. 7 illustrates a cross-sectional view of the valve assembly 300 according to aspects of the present disclosure, where the valve assembly 300 is shown in a closed position. The valve assembly 300 may include a housing 302 having a valve inlet 304 and a valve outlet 306 formed therein. As shown, the valve assembly 300 may include a valve chamber 308 defined by a portion of the housing 302. The valve chamber 308 may have a first end 310 and a second end 312 opposite the first end 310. The valve chamber 308 may be in fluid communication with the valve inlet 304 and the valve outlet 306. As shown in FIG. 7, the valve inlet 304 may be disposed adjacent the first end 310 of the valve chamber 308 and the valve outlet 306 may be disposed along a length of the valve chamber 308 between the first end 310 and the second end 312 of the valve chamber 308.

Figure 8:
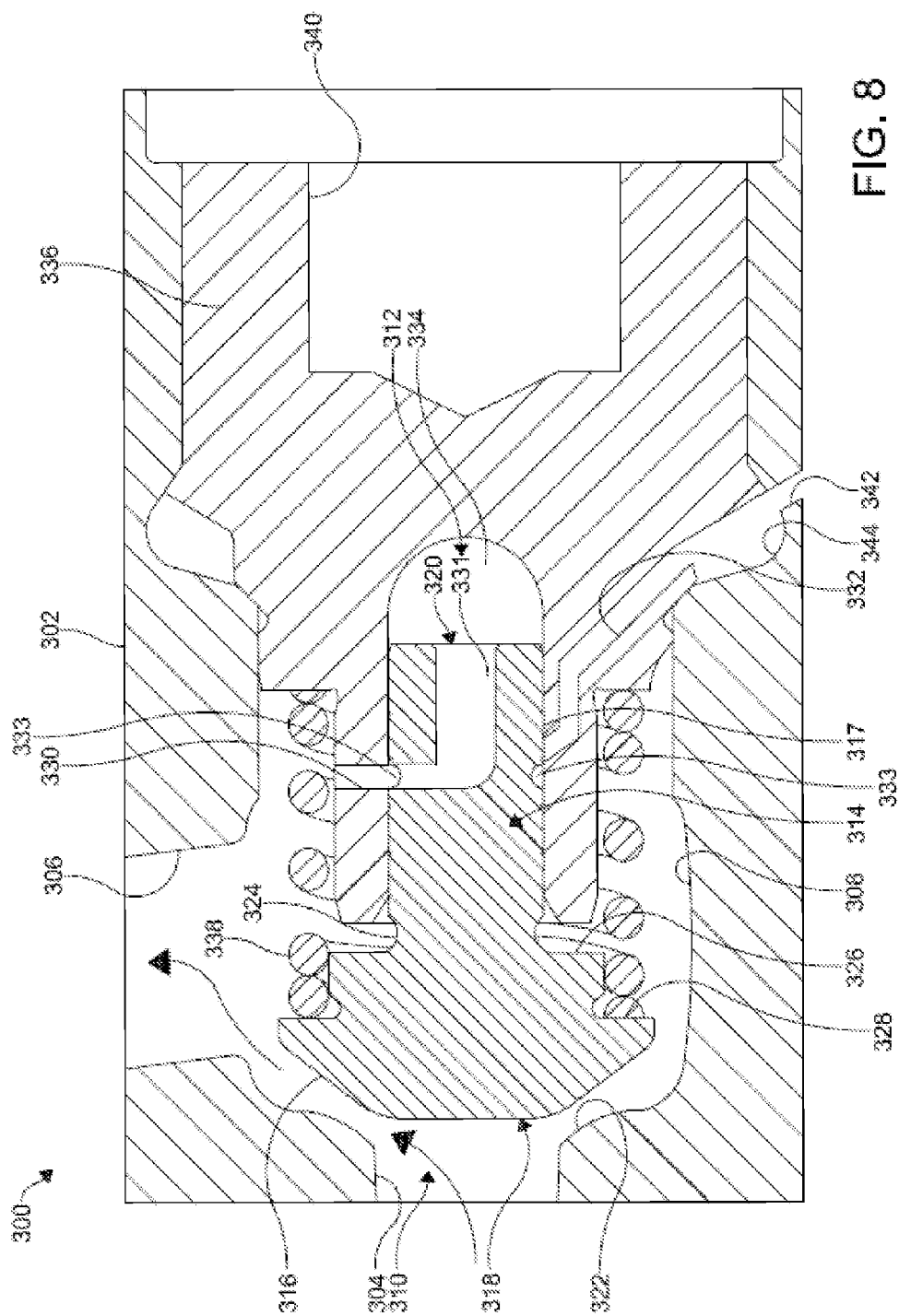
FIG. 8 is a cross-sectional view of the valve assembly of FIG. 7, showing the valve assembly in an opened position.
Figure 9:
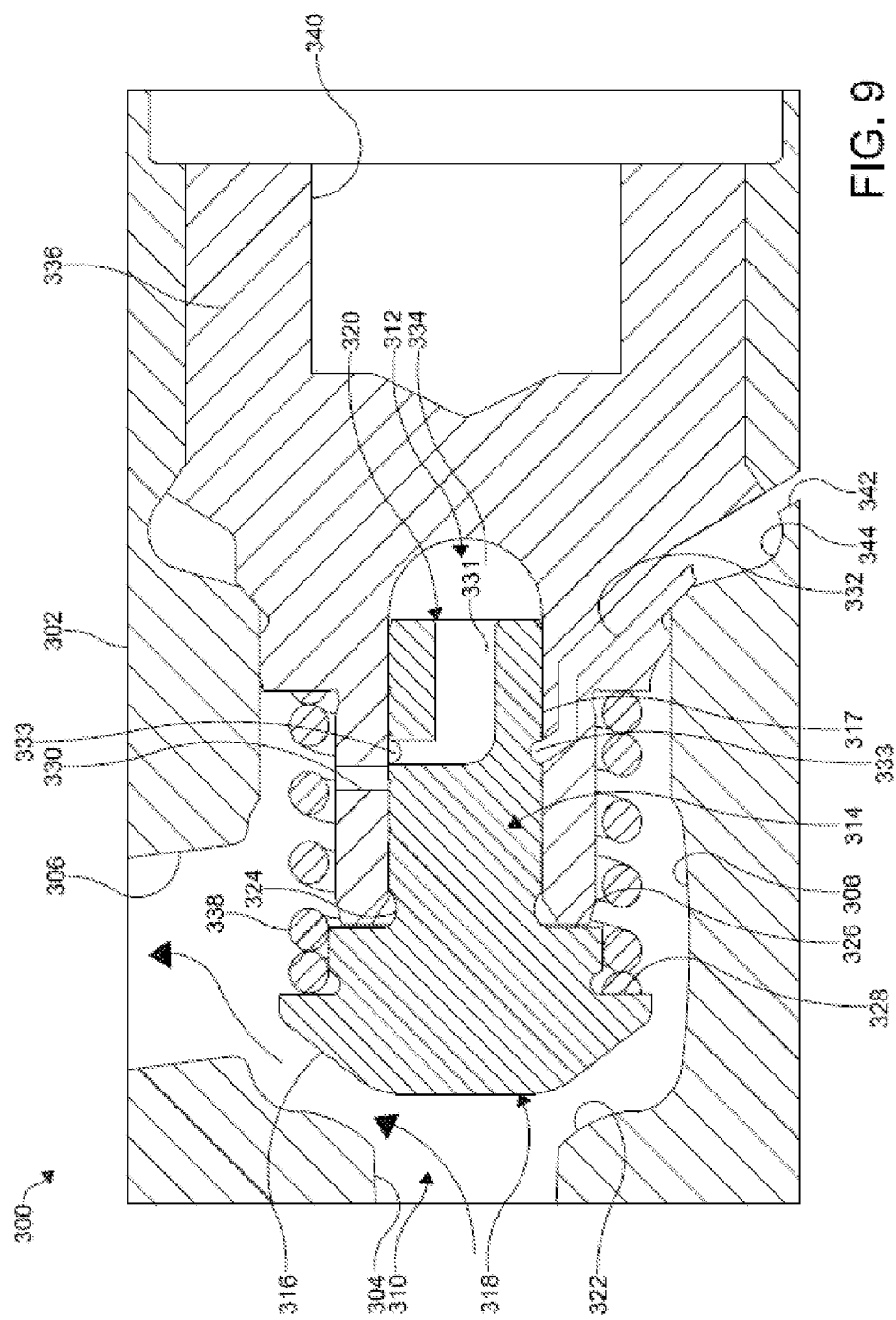
FIG. 9 is a cross-sectional view of the valve assembly of FIG. 7, showing the valve assembly in an opened position and venting a cavity to an environment.

The valve body 314 may be moveably disposed in the valve chamber 308. The valve body 314 may include a valve head 316 formed at a first end 318 of the valve body 314 opposite a second end 320 thereof. As shown, the valve head 316 may be oriented toward the first end 310 of the valve chamber 308. The valve head 316 may be configured to abut a valve seat 322 formed in a portion of the housing 302, for example, adjacent the valve inlet 304 at the first end 310 of the valve chamber 308. As shown in FIG. 7, the valve head 316 is in sealing engagement with the valve seat 322 such that the valve assembly 300 is in a closed or seated position. As shown in FIGS. 8 and 9, the valve head 316 is spaced (e.g., lifted) from the valve seat 322 such that the valve assembly 300 is in an opened position.

Returning to FIG. 7, the valve body 314 may include a base portion 317 extending from the valve head 316. As shown, the base portion 317 may terminate at a first shoulder 326 that extends beyond an outside diameter of the base portion 317. As an example, a second shoulder 328 may be formed at a portion of the valve head 316 and may extend beyond an outside diameter of the first shoulder 326.

A retainer 336 may be disposed adjacent the second end 312 of the valve chamber 308 and may sealingly engage a portion of the housing 302. A portion of the retainer 336 may define at least a portion of the cavity 334. As an example, the cavity 334 may be defined by the retainer 336, a portion of the housing 302, and the second end 320 of the valve body 314. The retainer 336 may also define at least a portion of the fluid chamber 340 such as a low pressure side of the valve assembly 300. As a further example, the fluid chamber 340 may experience pressures on the order of about 4-5 bar.

The retainer 336 may include one or more control orifices 330, 332 extending therethrough. As an example, a first control orifice 330 may provide fluid communication between the valve chamber 308 and the cavity 334. As another example, a second control orifice 332 may provide fluid communication between the cavity 334 and an environment external to the valve assembly 300. The control orifices 330, 332 may be of varying size and shape. Further, the control orifices 330, 332 may include one or multiple flow restriction means configured to controllably manipulate flow dynamics of the system. The control orifices 330, 332 may include holes, channels (e.g., flutes), and other arrangement to control flow dynamics through the retainer 336.

As shown in FIG. 7, a fluid chamber 331 may be formed in the valve body 314 and may terminate in fluid communication with the cavity 334. A channel 333 may be formed about at least a portion of the periphery of the valve body 314 and may be in fluid communication with the fluid chamber 331. As the valve body 314 moves from the first end 310 of the valve chamber 308 toward the second end 312 of the valve chamber 308 the channel 333 may align with the first control orifice 330 and/or the second control orifice 332 to provide fluid communication with the cavity 334.

A spring member 338 may be disposed in the cavity 334 and may be configured to bias the valve body 314 toward the valve seat 322. As shown, the spring member 338 is disposed between the retainer 336 and the valve body 314 (e.g., the second shoulder 328). As an example, the spring member 338 may be or include a coil spring. Other biasing elements may be used.

As shown in FIG. 7, the valve head 316 is in sealing engagement with the valve seat 322 such that the valve assembly 300 is in a closed or seated position, thereby preventing a flow of the liquid fuel between the valve inlet 304 and the valve chamber 308. As pressurized fluid flows through the valve inlet 304, such as during actuation of a plunger or piston of an associated high-pressure pump (e.g., pump 18 (FIG. 2)), a force is exerted on the valve head 316 in opposition to the bias of the spring member 338. As pressure builds at the valve inlet 304, the forces on the valve head 316 exceed the bias force of the spring member 338 and the valve body 314 moves away from the valve seat 322 and compresses the spring member 338. As an example, the pressure at the valve inlet 304 may be about 1800-2500 bar during a high pressure operation. Additionally, as the valve body 314 moves away from the valve seat 322, the fluid in the cavity 334 is compressed, thereby providing an additional biasing force in opposition of the movement of the valve body 314 toward the cavity 334. The fluid pressure in the cavity 334 mitigates pressure impulses that would normally cause the valve body 314 to compress the spring member 338 and even contact the retainer 336 at high velocities. The dimensions of the control orifices 332, a cross-sectional area of the valve body 314, and the stiffness of the spring member 338 may be configured so as to control a movement and/or position of the valve body 314 under various pressure conditions.

As shown in FIG. 8, the valve head 316 is spaced (e.g., lifted) from the valve seat 322 such that the valve assembly 300 is in an opened position. As such, fluid may flow from the valve inlet 304 to the valve outlet 306 and on to a manifold such as manifold 20 (FIG. 2), for example. When pressure is reduced at the valve inlet 304, the spring member 338 biases the valve body 314 toward the valve seat 322. However, the bias force of the spring member 338 is controlled by a pressure change in the cavity 334. For example, as the valve body 314 moves toward the valve seat 322, a pressure is reduced in the cavity 334 causing an opposing force to the bias of the spring member 338. In certain aspects, the first control orifice 330 facilitates fluid communication between the valve chamber 308 and the cavity 334 when the channel 333 is aligned with at least a portion of the first control orifice 330.

As shown in FIG. 9, pressure at the valve inlet 304 continues to cause the valve head 316 to lift further from the valve seat 322 such that the spring member 338 compresses further. As such, fluid may flow from the valve inlet 304 to the valve outlet 306 and on to a manifold such as manifold 20 (FIG. 2), for example. When pressure is reduced at the valve inlet 304, the spring member 338 biases the valve body 314 toward the valve seat 322. However, the bias force of the spring member 338 is controlled by a pressure change in the cavity 334. For example, as the valve body 314 moves toward the valve seat 322, a pressure is reduced in the cavity 334 causing an opposing force to the bias of the spring member 338. In certain aspects, the second control orifice 332 facilitates fluid communication between the cavity 334 and an environment external the valve assembly 300 when the channel 333 is aligned with at least a portion of the second control orifice 332. During such alignment, fluid may flow from the environment through the second control orifice 332 and into the cavity 334 to increase and/or equalize a pressure therein. Such flow may allow the valve body 314 to move toward the seat 322 in an accelerated manner until the fluid communication between the channel 333 and the second control orifice 332 is ceased, such as shown in FIGS. 7 and 8.

As an illustrative example, as the linear motion of the valve body 314 changes the volume of the cavity 334, a sudden motion of the valve body 314 is impeded by the flow dynamics of the cavity 334. Therefore, the cavity 334 decreases the maximum impact velocity of both the strokes and return motions of the valve body 314. As such, wear of the valve assembly 300 may be reduced and the life expectancy of the spring member 338 may be increased. In valve assembly 100 (of FIGS. 3 and 4), 200 (of FIGS. 5 and 6), and 300 (of FIGS. 7-9), the valve body 114, 214, 314 includes a recess 124, 224, 324 formed in the base portion and disposed adjacent the valve head.

INDUSTRIAL APPLICABILITY

The disclosed valve assemblies 100, 200, 300 may find potential utility for use with fuel pumps in internal combustion engines, and particularly to such engines utilizing high-pressure fuel systems, including compression ignition engines, such as diesel engines.

In general, technology disclosed herein may have industrial applicability in a variety of settings such as in a variety of diesel engine settings in which space requirements are particularly limited. The valve assemblies 100, 200, 300 may be effective to improve fuel pressure modulation of associated engines by reducing fuel pressure variability associated with divergent placements of control valve, sensor and relief valve units. Industrial applicability of such compact fuel pump units extends to virtually all motorized transport platforms, including automobiles, buses, trucks, tractors, industrial work machines and most off-road machines utilized in agriculture, mining, and construction.

The high pressure pump unit features disclosed herein may be particularly beneficial to wheel loaders and other earth moving, construction, mining or material handling vehicles that may utilize compact fuel pump systems within such fuel pump housings. Such pump unit features may also be particularly beneficial to the previously mentioned marine and industrial applications including petroleum, drilling, and electrical.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context.

We claim:

1. A valve assembly comprising:
   a housing defining a valve chamber, wherein the valve chamber comprises a first end and a second end opposite the first end;
   a valve inlet disposed adjacent the first end of the valve chamber and in fluid communication therewith, wherein the valve chamber is configured to receive a flow of fluid from the valve inlet;
   a valve outlet in fluid communication with the valve chamber to receive a flow of fluid from the valve chamber;
   a valve seat fixedly disposed at the first end of the valve chamber;
   a valve body movably disposed within the valve chamber, the valve body comprising a valve head and a base portion, wherein the base portion defines a fluid chamber having a channel formed in an outer surface of the base portion;
   a retainer sealingly engaging the housing and defining a cavity between the base portion of the valve body and the retainer, wherein the retainer comprises a plurality of control orifices formed therein and configured to provide fluid communication to the cavity to regulate a position of the valve body between the first end and the second end of the valve chamber based on at least a pressure difference between the valve chamber and the cavity, and wherein a position of the valve body between the first end and the second end of the valve chamber controls an alignment of the channel formed in the valve body and one or more of the plurality of control orifices, wherein a first control orifice of the plurality of control orifices is in fluid communication with the valve chamber; and
   a spring member disposed between the retainer and the valve body, wherein the spring member is configured to bias the valve body towards the first end of the valve chamber, and wherein the valve head of the valve body is configured to abut against the valve seat to prevent a flow of fluid between the valve inlet and the valve chamber.

2. The valve assembly of claim 1, wherein the valve head further comprises a shoulder and the spring member abuts the shoulder.

3. The valve assembly of claim 1, wherein the valve outlet is disposed along a length of the valve chamber between the first end of the valve chamber and a second end of the valve chamber.

4. The valve assembly of claim 1, wherein valve body further comprises a recess formed in the base portion and disposed adjacent the valve head.

5. The valve assembly of claim 1, wherein a second control orifice of the plurality of control orifices is in fluid communication with an environment external to the valve chamber.

6. The valve assembly of claim 1, wherein the retainer defines at least a portion of a fluid chamber and wherein a portion of the retainer is interposed between the cavity and the fluid chamber.

* * * * *